(12) United States Patent
Brennan et al.

(10) Patent No.: US 11,753,858 B2
(45) Date of Patent: Sep. 12, 2023

(54) ELECTRICAL CONNECTION METHOD TO MOVABLE WINDOW

(71) Applicant: GENTEX CORPORATION, Zeeland, MI (US)

(72) Inventors: Drew D. Brennan, Holland, MI (US); David J. Cammenga, Zeeland, MI (US); Luke A. Bomers, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 687 days.

(21) Appl. No.: 16/906,393

(22) Filed: Jun. 19, 2020

(65) Prior Publication Data

US 2020/0399946 A1 Dec. 24, 2020

Related U.S. Application Data

(60) Provisional application No. 62/864,725, filed on Jun. 21, 2019.

(51) Int. Cl.
| | |
|---|---|
| *E05F 11/38* | (2006.01) |
| *E05F 15/689* | (2015.01) |
| *E06B 3/66* | (2006.01) |

(52) U.S. Cl.
CPC .......... *E05F 11/385* (2013.01); *E05F 15/689* (2015.01); *E06B 3/66* (2013.01); *E05Y 2400/654* (2013.01); *E05Y 2900/55* (2013.01)

(58) Field of Classification Search
CPC ..... E05F 11/385; E05F 15/689; E05F 15/655; E06B 3/66; E05Y 2400/654;
(Continued)

(56) References Cited

U.S. PATENT DOCUMENTS

| | | | | |
|---|---|---|---|---|
| 2010/0146859 | A1* | 6/2010 | Gipson | E05F 15/632 49/348 |
| 2014/0049100 | A1* | 2/2014 | Iwaya | B60R 16/0237 307/9.1 |

(Continued)

FOREIGN PATENT DOCUMENTS

| | | |
|---|---|---|
| CN | 103253114 A | 8/2013 |
| CN | 106364289 A | 2/2017 |

(Continued)

OTHER PUBLICATIONS

Machine translation of DE-202015105634 retrieved from Espacenet on Apr. 8, 2023 (Year: 2023).*

(Continued)

*Primary Examiner* — Thomas Ingram
(74) *Attorney, Agent, or Firm* — Price Heneveld LLP; Brian James Brewer

(57) ABSTRACT

A movable window apparatus is disclosed. The movable window apparatus may comprise a window panel, a first electrical contact, and a second electrical contact. The window panel is operable between an opened position and a closed position. The first electrical contact is coupled to the window panel. The second electrical contact is coupled to the vehicle. Further, the first electrical contact is operable to engage the second electrical contact when the window panel is in a first position and disengage the second electrical contact when the window panel is out of the first position. Engagement of the second electrical contact by the first electrical contact forms a conductive connection. This conductive connection has the advantage of being engageable and dis-engageable. Accordingly, the movable window apparatus enables a conductive connection with a window panel without inhibiting the movement of the window panel between two or more positions.

9 Claims, 9 Drawing Sheets

(58) Field of Classification Search
CPC ............. E05Y 2900/55; E05Y 2400/64; E05Y 2900/542; B60J 3/04; B60J 7/0573; B60J 7/043

See application file for complete search history.

(56) References Cited

U.S. PATENT DOCUMENTS

| | | | | |
|---|---|---|---|---|
| 2014/0097636 | A1* | 4/2014 | Snider | B60J 1/001 |
| | | | | 296/97.8 |
| 2016/0248371 | A1* | 8/2016 | Eo | B60J 7/04 |
| 2017/0001498 | A1* | 1/2017 | Park | B60J 7/0573 |
| 2017/0217291 | A1* | 8/2017 | Yasumoto | B60J 7/22 |
| 2018/0102634 | A1* | 4/2018 | Park | B60J 7/043 |
| 2020/0399946 | A1* | 12/2020 | Brennan | B60J 3/04 |

FOREIGN PATENT DOCUMENTS

| | | |
|---|---|---|
| DE | 4413905 C1 | 7/1995 |
| DE | 19813324 A1 | 10/1999 |
| DE | 19848885 A1 | 5/2000 |
| DE | 202015105634 U1 | 1/2017 |
| DE | 202015105634 U1 * | 3/2017 |
| DE | 102018103813 A1 | 8/2018 |
| DE | 102017008096 A1 | 2/2019 |
| FR | 2899855 B1 | 10/2007 |
| WO | 2020012361 A1 | 1/2020 |

OTHER PUBLICATIONS

International Search Report dated Sep. 24, 2020, for correspondence PCT application No. PCT/US2020/038659, 2 pages.
Written Opinion dated Sep. 24, 2020, for correspondence PCT application No. PCT/US2020/038659, 4 pages.
International Preliminary Report on Patentability dated Dec. 21, 2021, for corresponding PCT application No. PCT/US2020/038659, 5 pages.
The Extended European Search Report dated Jun. 1, 2022, for corresponding European application No. 20826832.6, 8 pages.

* cited by examiner

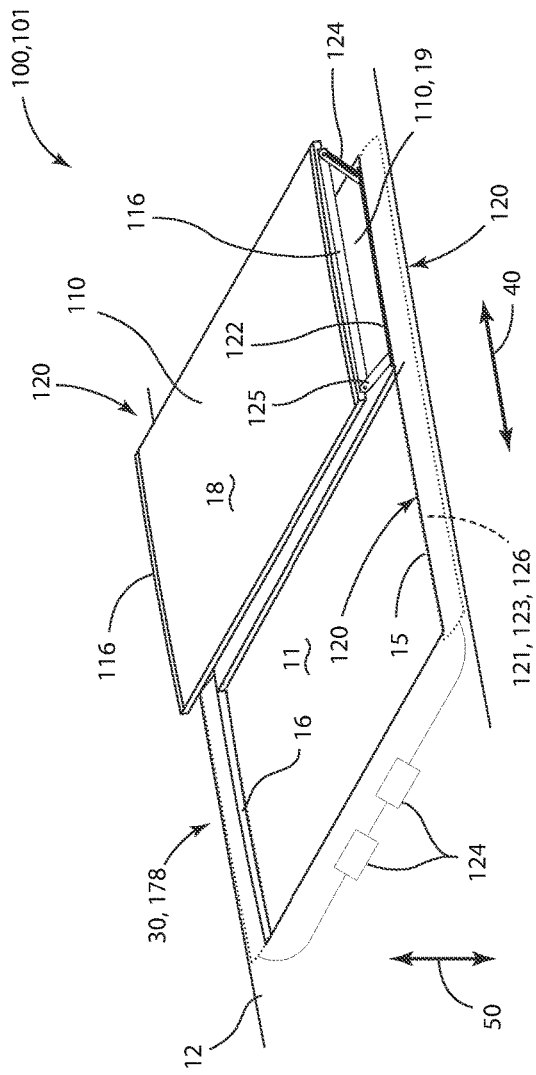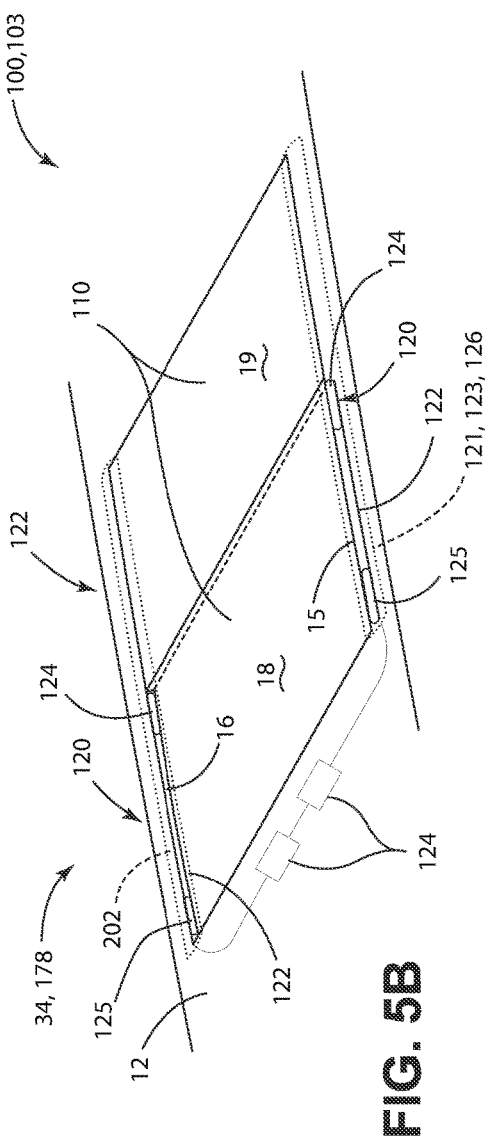
FIG. 5A
FIG. 5B

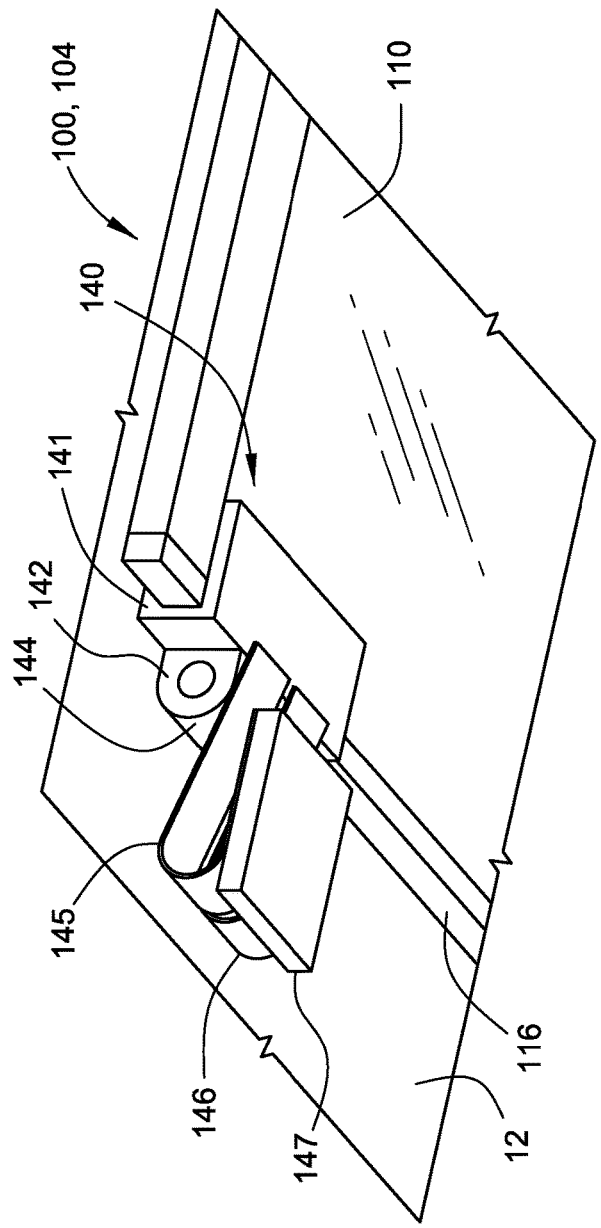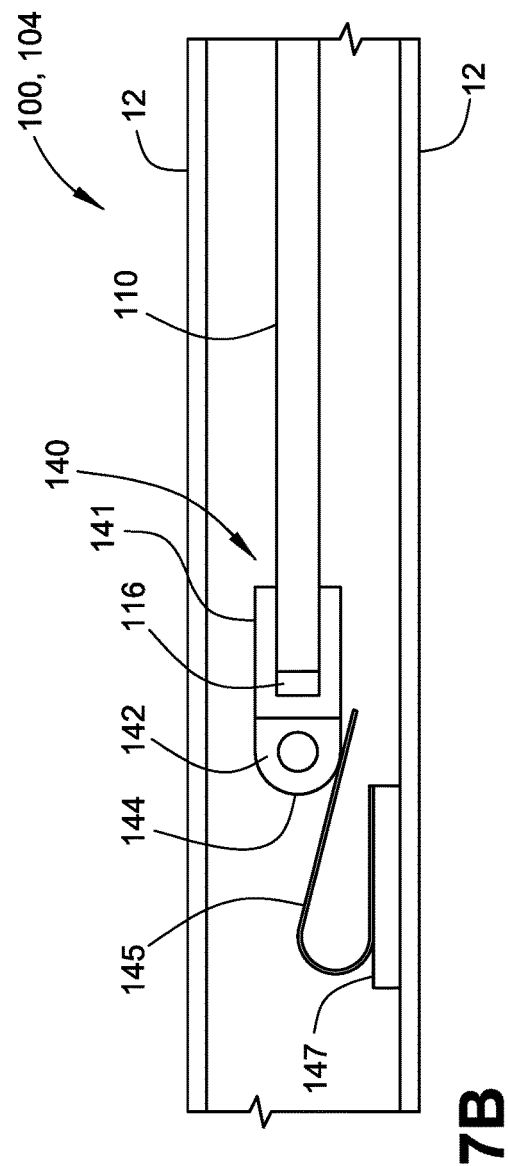
FIG. 7A
FIG. 7B

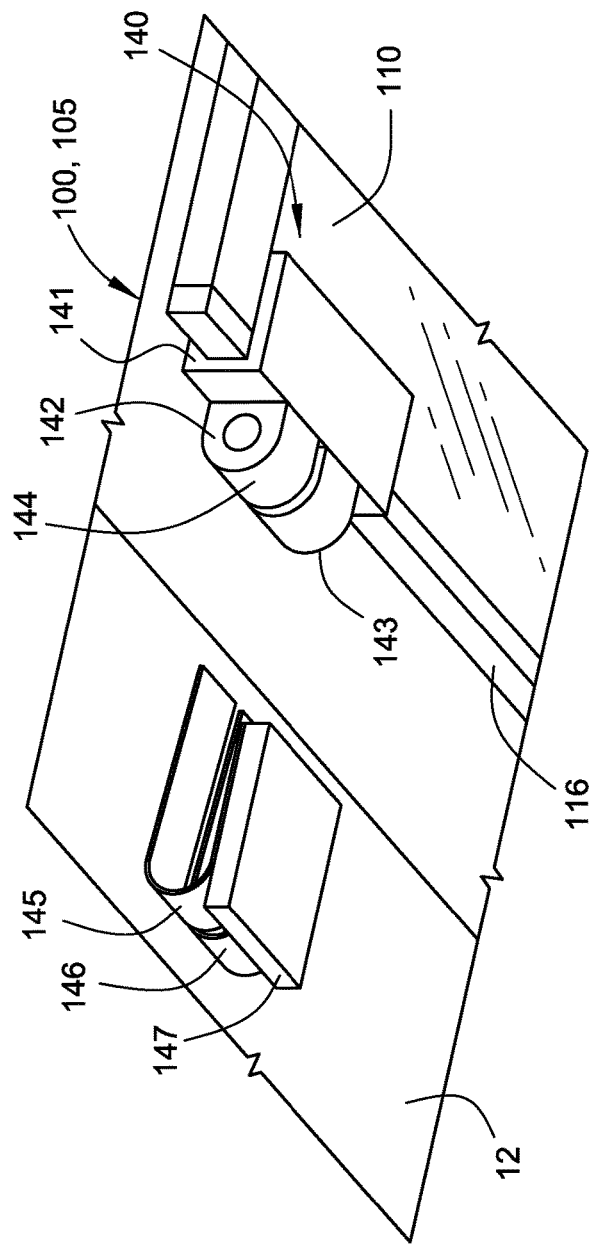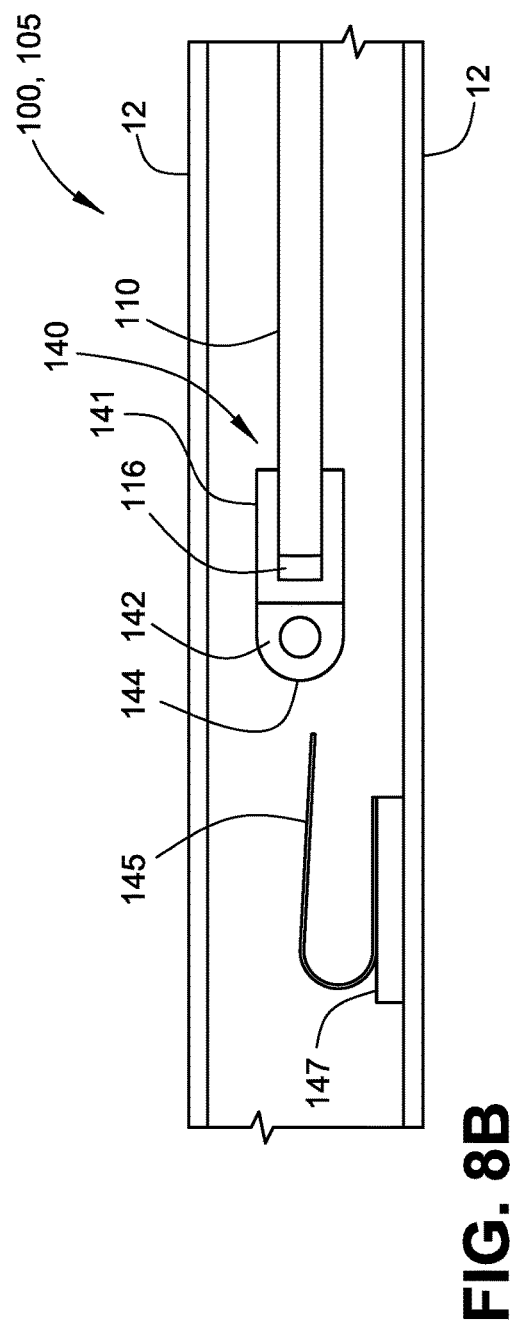
FIG. 8A
FIG. 8B

ELECTRICAL CONNECTION METHOD TO MOVABLE WINDOW

CROSS-REFERENCE TO RELATED APPLICATIONS

This application claims priority under U.S.C. § 119(e) to U.S. provisional Application No. 62/864,725 filed on Jun. 21, 2019, entitled "ELECTRICAL CONNECTION METHOD TO MOVABLE SUNROOF PANEL," the disclosure of which is hereby incorporated by reference in its entirety.

FIELD OF THE DISCLOSURE

This disclosure generally relates to an electrical connection method for a movable window panel and, more particularly, to a selectively engaging electrical connection method for a movable window panel.

SUMMARY OF THE DISCLOSURE

In accordance with the present disclosure, disadvantages and problems associated with incorporating electro-optic elements into movable windows have been substantially reduced or eliminated.

In accordance with one embodiment of the present disclosure, an apparatus is disclosed. The apparatus comprises a window panel, a first electrical contact, and a second electrical contact. The window panel is operable between an opened position and a closed position. The first electrical contact is coupled to the window panel. The second electrical contact is coupled to the vehicle. Further, the first electrical contact is operable to engage the second electrical contact when the window panel is in a first position and disengage the second electrical contact when the window panel is out of the first position. Engagement of the second electrical contact by the first electrical contact forms a conductive connection. In some embodiments, the first position may be the closed position. In other embodiments, the first position may be the open position. In yet other embodiments, the first position may be an intermediate position between the open and closed positions. In some embodiments, the window panel may be further operable to a venting position. Accordingly, in some further embodiments, the venting position may be the first position. In some embodiments, the window panel may be a sunroof.

The second electrical contact may be disposed on a biasing member. The biasing member may be operable to move the second electrical contact between a retracted position and an extended position. Further, the biasing member may bias the second electrical contact in the extended position. In some embodiments, the engagement of the second electrical contact by the first electrical contact may be operable to move the second electrical contact, at least in part, to a retracted position. In some embodiments, the biasing member may be a wind deflector.

The window panel may comprise an electro-optic element. The electro-optic element may be operably variably transmissive. Further, the first electrical contact may be electrically connected to the electro-optic element. Accordingly, the conductive connection may be operable to conduct an electrical signal operable to vary the transmittance of the electro-optic element.

The first electrical contact may comprise at least one protrusion. Further, engagement of the second electrical contact may be the at least one protrusion of the first electrical contact.

The apparatus may further comprise a power storage device. The power storage device may be coupled to the window panel such that movement between the open and closed positions of the window panel translates to movement of the power storage device. Additionally, the power storage device may be further coupled to the first electrical contact such that the power storage device is operable to receive power from the first electrical contact. Accordingly, the power storage device may be operable to supply the window panel with power when the first electrical contact is not in engagement with the second electrical contact.

The apparatus may also further comprise a wireless communication module. The wireless communication module may be communicatively connected to the window panel and a controller disposed in the vehicle. Accordingly, the controller may very a transmittance of the window panel when the first electrical contact is not in engagement with the second electrical contact.

In some embodiments, the first electrical contact may comprise a first contact pad and a second contact pad. Similarly, the second electrical contact may comprise a first contact spring and a second contact spring. Accordingly, when the window panel is in the first position, the first contact spring may engage the first contact spring and the second contact pad may engage the second contact spring. The engagement between the first and second electrical contacts may be slidably engaged. In some further embodiments, the first and second contact pads may each have a leading portion that operably engages the respective first and second contact springs. The leading portion may be curved.

In some further embodiments, engagement of the first and second contact springs may be operable to deflect each of the first and second contact springs. In some further embodiments, each of the first and second contact springs may be biased toward a first configuration. Further, the deflection of each of the first and second contact springs may be against the bias. The bias may serve to stabilize the conductive connection.

In some embodiments, the apparatus may further comprise a light sensor. The light sensor may be disposed in an interior of a vehicle relative the window panel. Further, the window panel may be operable to vary its transmittance based, at least in part, on a level of light detected by the light sensor.

The advantages of certain embodiments of the present disclosure include enabling a conductive connection with a window panel that is movable. This conductive connection has the advantage of being engageable and dis-engageable. Accordingly, in embodiments where the window panel is electro-optic, the conductive connection does not inhibit movement between one or more positions. Additionally, in embodiments where the first electrical contact comprises a protrusion, the engagement between the first electrical contact and the second electrical contact may be focused at the protrusion. Focusing the engagement at the protrusion may have the advantage of optimizing the conductive connection between the first electrical contact and the second electrical contact. Additional benefits or advantages of various embodiments may also be realized and/or achieved.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF THE DRAWINGS

In the drawings:

FIG. 5A: Perspective view of a movable window apparatus in an open position.

FIG. 5B: Perspective view of a movable window apparatus in a closed position.

FIG. 7A: A perspective sectional view of a movable window apparatus in a first position having an electrical connection assembly.

FIG. 7B: A cross-sectional view of a movable window apparatus in a first position having an electrical connection assembly.

FIG. 8A: A perspective sectional view of a movable window apparatus in a second position having an electrical connection assembly.

FIG. 8B: A cross-sectional view of a movable window apparatus in a second position having an electrical connection assembly.

DETAILED DESCRIPTION

Figure 1:
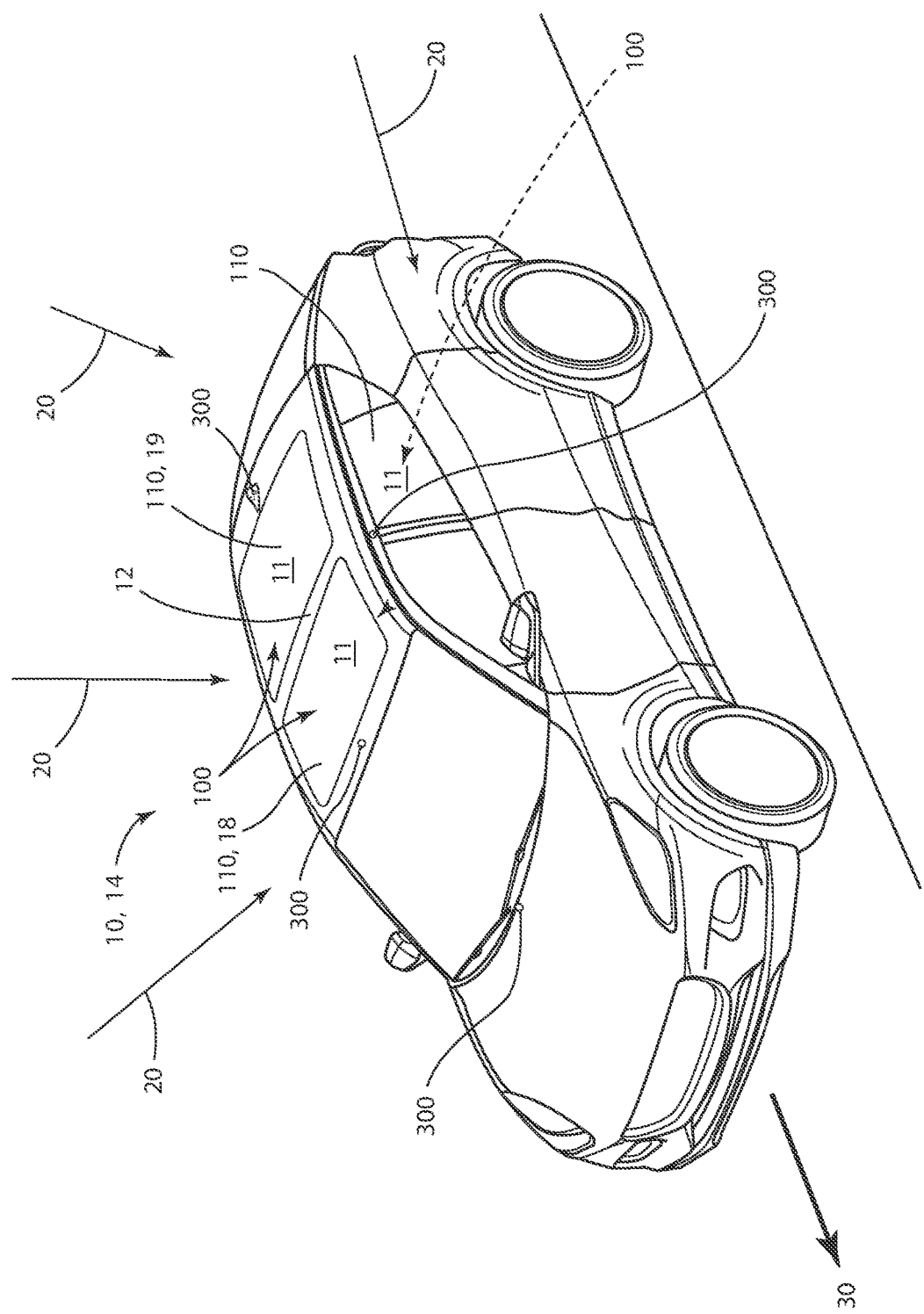
FIG. 1: Perspective view of a vehicle having a movable and/or dimmable window apparatus.

The present illustrated embodiments reside primarily in combinations of method steps and apparatus components related to an electrical connection method to a movable window panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
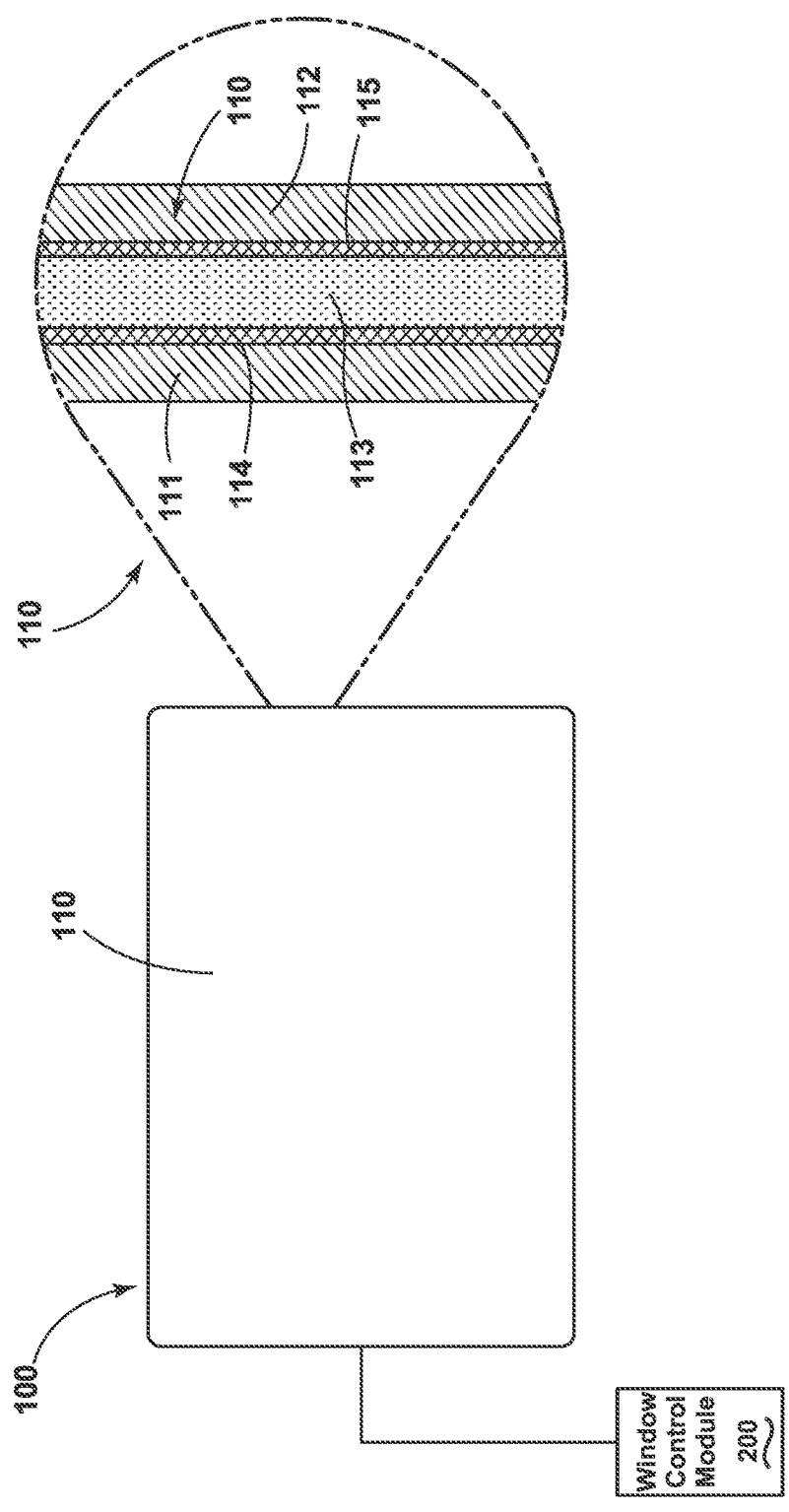
FIG. 2: Schematic representation of a window panel including a detailed cross-sectional representation of an electro-optic dimmable embodiment.

FIGS. 1-8B illustrate a vehicle 10 having a movable window apparatus 100. Movable window apparatus 100 may be operable to position into and/or enclose an opening 11. Opening 11 may be formed by one or more panels 12 of the vehicle 10. Accordingly, movable window apparatus 100 includes a window panel 110 operably moved between an opened position 101, an intermediate position (not shown), a vented position 102, a closed position 103, a first position 104, and/or a second position 105. Window panel 110, for example, may correspond to a sunroof window, side window, or windscreen. In some embodiments, window panel 110 may be an electro-optic dimmable window.

Where window panel 110 is a dimmable window, window panel 110 may be operable to vary the transmittance of light therethrough at one or more wavelengths. Further, the one or more wavelengths may be in the visible region of the electromagnetic spectrum. In some embodiments, as shown in FIG. 2, window panel 110 may comprise a first substrate 111, a second substrate 112, an electro-optic medium 113, a first electrode 114, and a second electrode 115.

The first and second substrates 111, 112 may be disposed in a spaced apart relationship relative one another. Additionally, the first and second substrates 111, 112 may be formed of various materials. For example, the first and second substrates 111, 112 may be formed of plastic materials, such as a clear polycarbonate, polyethylene terephthalate (PET), polyamide, acrylic, cyclic olefin, polyethylene (PEN), metallocene polyethylene (mPE), silicone, urethane, and various polymeric material; and/or formed of glass, such as, soda lime float glass, borosilicate glass, boro-aluminosilicate glass, or various other compositions. Further, glass substrates, may be annealed, heat strengthened, chemically strengthened, tempered, or safety glass.

Electro-optic medium 113 is disposed between the first and second substrate 111, 112. Electro-optic medium 113, for example, may be an electrochromic medium, a liquid crystal medium, electrophoretic medium, or a suspended particle medium. Further, electro-optic medium 113 is operable to enter an activated state during exposure to an electrical potential and/or field. In an activated state, electro-optic medium 113 may be operable to exhibit a change, relative an un-activated state, in its extinction coefficient at one or more wavelengths in the visible spectrum.

In some embodiments, electro-optic medium 113 may be further operable to return to an un-activated state during an absence of an electrical potential and/or field. In other embodiments, electro-optic medium 113 may comprise memory chemistry technology. Accordingly, electro-optic medium 113 may be operable to enter an activated state and remain in the activated state for a substantial time period until an electrical potential and/or field is applied to de-activate the electro-optic medium.

First electrode 114 may be disposed between electro-optic medium 113 and first substrate 111. Second electrode 115 may likewise be disposed between electro-optic medium 113 and second substrate 112. Further, the first and second electrodes 114, 115 may be electrically conductive and substantially transparent in the visible spectrum. For example, the first and second electrodes 114, 115 may be a transparent conductive oxide (TCO) such as fluorine doped tin oxide (FTO), indium tin oxide (ITO), aluminum doped zinc oxide (AZO), or indium zinc oxide (IZO). Accordingly, the first and second electrodes 114, 115, in conjunction, may be operable to apply the electrical potential and/or field to electro-optic medium 113.

Figure 3:
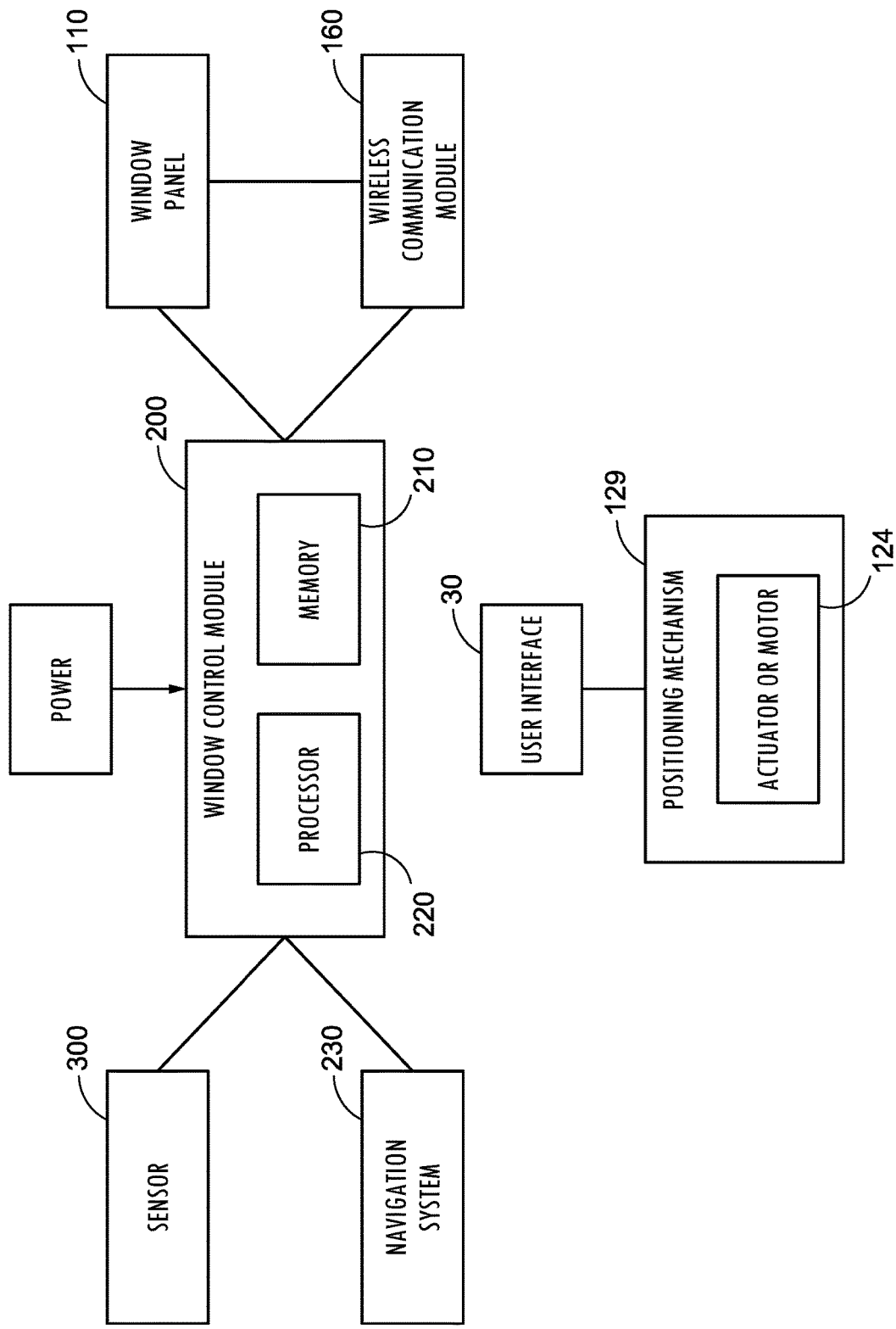
FIG. 3: Block schematic diagram of a vehicle system having one or more movable and/or dimmable window panel.

Additionally, a window control module 200 may be communicatively connected to the first and second electrodes 114, 115 of the window panel 110. Window control module 200 may be a controller. Further, as shown in FIG. 3, window control module 200 may comprise a memory 210 and a processor 220. Memory 210 may store various instructions and routines configured to control the transmittance of window panel 110. Further, processor 220 may be operable to execute the various instructions and routines. Accordingly, the electrical potential and/or field applied by the first and second electrodes 114, 115 may be controlled by window control module 200. Therefore, window control module may be operable to vary the transmittance of one or more window panel 110 of vehicle 10.

In varying the transmittance of one or more window panel 110 of vehicle 10, window control module 200 may be configured to optimize comfort and visibility form an interior 13 of vehicle 10 by way of controlling thermal load, total light, and glare that is transmitted through window panel 110. In some embodiments, window control module 200 may further control the transmittance of a window panel 110 based, at least in part, on a signal from one or more sensor 300.

Figure 4:
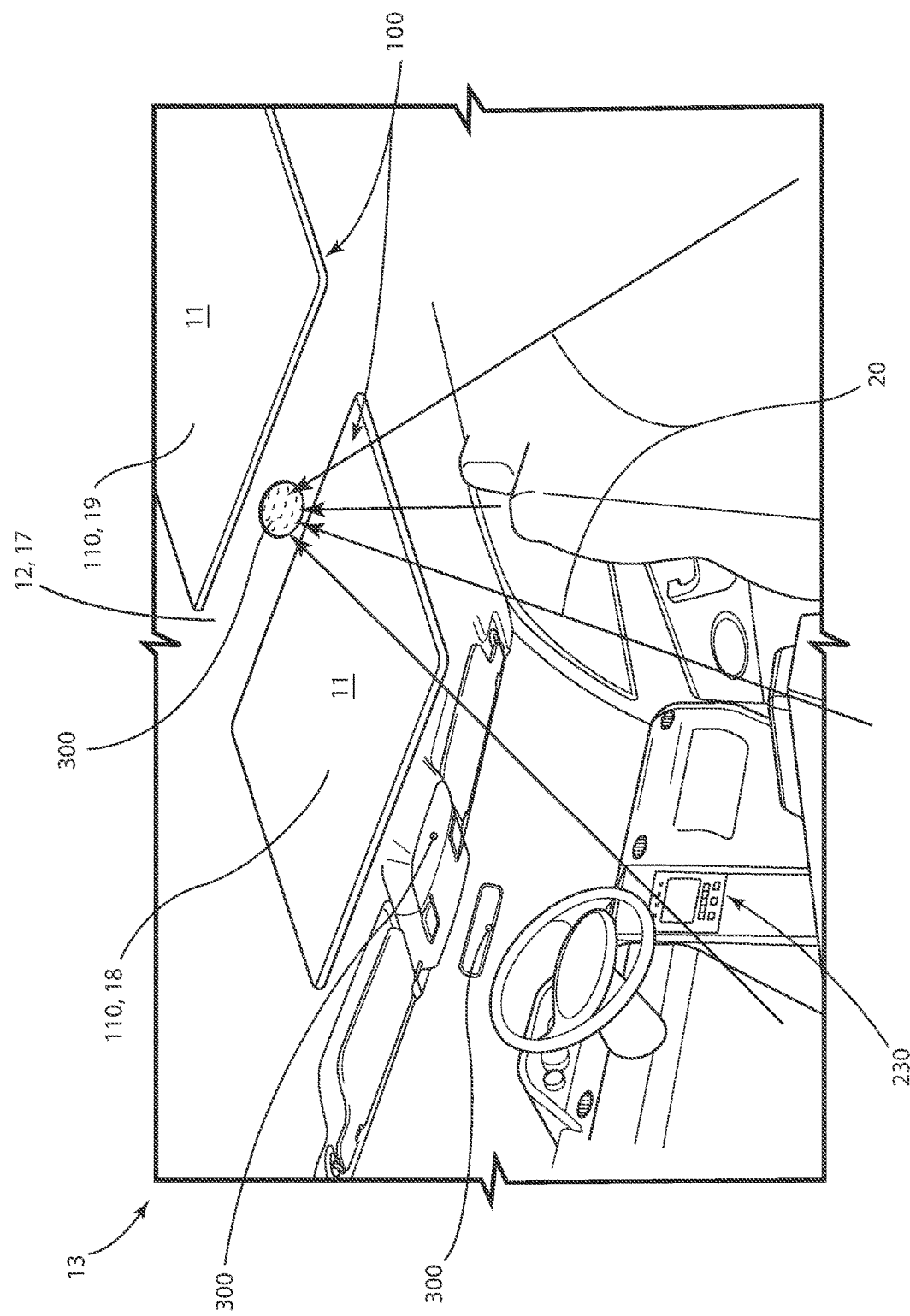
FIG. 4: Perspective view of an interior of a vehicle having a movable and/or dimmable window apparatus.

Sensor 300 may be disposed on in the interior 13, as shown in FIG. 4, or on an exterior 14, as shown in FIG. 1, of vehicle 10. Further, as shown in FIG. 3, sensor 300 may be communicatively connected to window control module 200. Sensor 300 may be a light sensor, such as a directional light sensor, an ambient light sensor, and/or an imager. An ambient light sensor may be configured to detect an ambient lighting level of the environment in which it is disposed. A directional light sensor may be configured to identify both a lighting level and an approximate direction of origin of light 20. Accordingly, the directional light sensor may be operable to determine a direction of light 20 impinging vehicle 10. In some embodiments, the directional light sensor may include a plurality of light sensors or imager modules configured to detect the lighting level in the orientation direction of the light sensor or imager. A light sensors or imager may comprise Semi-Conductor Charge-Coupled Devices (CCD) or pixel sensors of Complementary Metal-Oxide-Semi-Conductor (CMOS) technologies.

Accordingly, the one or more sensor 300 may enable window control module 200 to monitor various external regions of vehicle 10 to identify or map variations in the intensity of light 20 impinging upon respective regions of vehicle 10. Therefore, window control module 200 may vary one or more window panel 110, based at least in part, on the variations in intensity of light 20.

In some embodiments, where one or more sensor 300 is disposed in the interior 13 of vehicle 10, window control module 200 may be operable to identify one or more levels of light 20 in one or more directions. Based on the levels of light 20 in the one or more directions, window control module 200 may vary the transmittance of one or more window panel 110 to ensure that an intensity of light 20 is consistently transmitted into the vehicle from one or more directions.

In some embodiments, window control module 200 may be connected to a navigation system 230. Navigation system 230 may include a global positioning system (GPS) and/or a directional sensor (e.g., compass, magnetometer, etc.). The directional sensor may be operable to provide a heading direction 30. Heading direction 30 may be an orientation of vehicle 10. In other words, heading direction 30 may be the direction vehicle 10 is facing. In some embodiments, heading direction 30 may be determined based on a change in a position reported by navigation system 230.

Based, at least in part, on readings of one or more sensor 300, on heading direction 30, on a time of day, and/or on a region in which vehicle 10 is operating, window control module 200 may be configured to determine a direction of light 20 relative vehicle 10 and/or one or more window panel 110. In some instances, light 20 may be from the sun. Further, window control module 200 may be operable to reduce the transmittance of light 20 through one or more window panel 110 proportional to an estimated, calculated, or measured amount of light 20 impinging a respective window panel 110. Therefore, window panels 110 of vehicle 10 facing the light source relative vehicle 10 interior 13 may be operated to have a lower light transmittance than those facing away from the light source.

Window panel 110 of movable window apparatus 100 may operably move between an open position 101 (FIG. 5A) and/or a closed position 103 (FIG. 5B). Additionally, movable window apparatus 100 may be provide for an electrical contact to window panel 110 at one or more positions.

In some embodiments, as shown in FIGS. 5A-B, movable window apparatus 100 may comprise a positioning mechanism 120 coupled to the window panel 110. As illustrated, movable widow apparatus 100 may be a sunroof. Positioning mechanism 120 may be configured to selectively position window panel 110 between opened position 101 and closed position 103. In open position 101, all or part of opening 11 may be exposed.

Opening 11 may have a first side 15 and a second side 16. In some embodiments, along each side of opening 11, positioning mechanism 120 may comprise a track 121. A track 121 may extend along and/or beyond opening 11. Further, track 121 may be configured to receive and guide an adjustment block 122 along a path 123. Window panel 110 may comprise a full or partial frame 116. Frame 116 may support, hold, guide, and/or translate a movement to window panel 110. Each adjustment block 122 may be mechanically connected to window panel 110 and/or frame 116 via a first attachment link 124 and a second attachment link 125.

In operation, positioning mechanism 120 may slidably engage each adjustment block 122 such that each adjustment block 122 is guided along a respective track 121. The positions of the adjustment blocks 122 may be controlled by one or more actuators or motors 124. The positioning of the adjustment blocks 122 by the one or more actuator or motor 124 may be determined by a user interface 30 in the interior 13 of vehicle 10. Accordingly, positioning mechanism 120 may position window panel 110 in response to an input from user interface 30.

Accordingly, between opened position 101 and the closed position 103, positioning mechanism 120 guides window panel 110 along path 132. In some embodiments, in response to the position of window panel 110 along path 123, attachment links 125, 125 may adjust a height of frame 116 and/or window panel 110 relative to the at least one panel 12 of vehicle 10. Accordingly, positioning mechanism 120 may be configured to adjust a lateral position 40 and/or a vertical position 50, such that window panel 110 may be positioned between closed position 103 and open position 101.

In some embodiments, along each of first side 15 and second side 16 of opening 11 may comprise one or more trough or channel 126 extending there along. Trough or channel 126 may further extend the length of track 121. Each trough or channel 126 may be substantially enclosed by the one or more panels 12 of vehicle 10. Therefore, an internal passage may be formed between the one or more panels 12 and a headliner 17 or various additional body components forming a roof of vehicle 10. Each trough or channel 126 may provide a passage for one or more components of positioning mechanism 120, such as track 121 and/or adjustment block 122. Accordingly, adjustment block 122 may be freely positioned providing for lateral positioning 40.

In some embodiments, each trough or channel 126 may guide and/or receive a conductive connection configured to communicate one or more of a current, a voltage, a potential, and/or an electrical signal. The conductive connection may ultimately be to a first electrode 114 and a second electrode 115 of the window panel 11 from the window control module 200. Accordingly, window control module 200 may be operable to control the transmittance of window panel 110.

In some embodiments, window panel 11 may be a sunroof. Further, as shown in FIGS. 1, 4, and 5A-B, vehicle 10 may comprise two window panels 110 as a first sunroof 18 and a second sunroof 19. In some further embodiments, first sunroof 18 may be disposed in heading direction 30 relative second sunroof 19. Accordingly, first sunroof 18 may be a forward sunroof and second sunroof 19 may be a rearward sunroof. Additionally, in some embodiments, first sunroof 18 and second sunroof 19 may make up a panoramic sunroof.

In some embodiments of the panoramic sunroof, as shown in FIG. 5A, when first sunroof 18 is in an open position 101, first sunroof 18 may be vertically positioned 50 relative second sunroof 19. Accordingly, first sunroof 18 may be over top of second sunroof 19. Further, second sunroof 19 may be disposed between tracks 121 of first sunroof 18.

In some embodiments, as illustrated in FIGS. 6A-D, movable window apparatus 100 may comprise a first electrical connection assembly 130. First electrical connection assembly 130 may be operable to facilitate a conductive connection of vehicle 10 and/or window control module 200 with window panel 110. The conductive connection may operably conduct one or more of a current, a voltage, a potential, and/or an electrical signal. Further, various embodiments of first electrical connection assembly 130 may facilitate the conductive connection when window panel 110 is in an opened position 101, an intermediate position (not shown), a vented position 102, and/or a closed position 103.

In some embodiments, as shown in FIGS. 6A-D, first electrical connection assembly 130 may comprise a first electrical contact 131 and a second electrical contact 132. First electrical contact 131 may be coupled to window panel 110 and/or frame 116. Second electrical contact 132 may be coupled to a biasing member 133. Biasing member 133 may be operable between an extended position (FIG. 6C) and a retracted position (FIGS. 6A-B) based, at least in part, on pressure or displacement. However, biasing member 133 is biased toward the extended position. Accordingly, second electrical contact 132 may be operable between extended and retracted positions with a bias toward the extended position. Biasing member 133 may be a spring-biased member. Further, second electrical contact 132 may be electrically connected to at least one of vehicle 10, a power source, and/or window control module 200 via an electrical connection 137. Electrical connection 137, for example, may be a wire.

An interaction between biasing member 133 and window panel 110 may depend on the position of window panel 110 (e.g., opened, intermediate, vented, and/or closed positions 101, 102, 103). For example, biasing member 133 and second electrical contact 132 may be fully or partially displaced into the retracted position by window panel 110 and/or frame 116 when window panel 110 is in the closed position 103, overcoming the biasing force of biasing member 133. When window panel 110 is in opened position 101, biasing member 133 may return to the extended position.

Components of first electrical connection assembly 130 may be disposed such that the conductive connection may be formed when window panel 110 is in open position 101, intermediate position, vented position 102, and/or closed position 103. The Intermediate position may correspond to a position of window panel 110 between open position 101 and closed position 103. Accordingly, transmittance variance of window panel 110 may be enabled at any position based on a respective placement of the first electrical connection assembly 130. Additionally, in some embodiments, components of first electrical connection assembly 130 may operably disengage, eliminating the conductive connection, in response to window panel 110 moving from the respective position where the conductive connection is formed.

When window panel 110 is in the position where first electrical connection assembly 130 is intended to form the conductive connection, first electrical contact 131 may engage and contact second electrical contact 132. The contact may be operable to fully or partially displace the second electrical contact 132 and biasing member 133 to fully or partially retracted positions. When window panel 110 is not in the position where first electrical connection assembly 130 is intended to form the conductive connection, first electrical contact 131 and second electrical contact 132 may be disengaged.

In some embodiments when window panel 110 is in a position where first electrical connection assembly 130 is not intended to form the conductive connection, a portion of window panel 110 and/or frame 116 may fail to contact the second electrical contact 132. In other embodiments where window panel 110 is in a position where first electrical connection assembly 130 is not intended to form the conductive connection, a portion of window panel 110 and/or frame 116 may contact the second electrical contact 132. However, the contact is not conductive. Further, the contact may be operable to fully or partially displace the second electrical contact 132 and biasing member 133 to fully or partially retracted positions.

Further, in some embodiments, first electrical contact 131, as a whole or a portion thereof, may be extended outward from window panel 110 and/or frame 116. Accordingly, in some embodiments, as the lateral position 40 of window panel 110 changes, reaching the position where first electrical connection assembly 130 is intended to form the conductive connection may cause first electrical contact 131 to vertically position 50 in alignment with second electrical contact 132. Further, the alignment of first electrical contact 131 may cause displacement of second electrical contact 132, which may otherwise have been fully extended.

Alternatively, in some embodiments, second electrical contact 132 may be biased to engage and make contact with window panel 110 and/or frame 116. The contact may result in a fully or partially retracted second electrical contact 132 and biasing member 133. Further, as the lateral position 40 of window panel 110 changes, the contact may be shifted from a non-conductive contact to a conductive contact when the engagement is shifted to first electrical contact 131, due to alignment of window panel 110 and/or first electrical contact 131 with second electrical contact 132.

In some embodiments, biasing member 133 be a deflector 134. Further, second electrical contact 132 may be disposed on deflector 134. In some further embodiments, second electrical contact 132 may be configured as a conductive strip extending along at least a portion of deflector 134. Deflector 134 may be operable between an extended and a retracted position. Additionally, Deflector 134 may be disposed in heading direction 30 relative opening 11. Accordingly, deflector 134 may be disposed forward vehicle 10 relative opening 11. Deflector 134 may operate to deflect wind and reduce noise within interior 13 when window panel 110 is in open position 101. Further, when window panel 110 is in closed position 103, window panel 110 may be disposed onto deflector 134, moving deflector 134 into the retracted position.

In some embodiments, first electrical contact 131 may include a housing 135. Housing 135 may be coupled to frame 116 and/or window panel 110. As more closely illustrated in FIG. 6D, first electrical contact 131 may include one or more conductive connector 136 extending from first electrical contact 131 into housing 135 and/or window panel 110. By extending into window panel 110, conductive connector 136 may make an electrical connection with first electrode 114, and/or second electrode 115. Accordingly, conductive connector 136 may operably conduct a current, a voltage, a potential, and/or an electrical signal to window panel 110 and/or one or more powered feature, from first electrical contact 131.

In some embodiments, first electrical contact 131 may comprise one or more protrusions 138 extending toward second electrical contact 132. Accordingly, first electrical contact 131 may engage the second electrical contact 132 via the one or more protrusions 138. Additionally, or alternatively, in some embodiments, the first and/or second electrical contacts 131, 132 may include a coating. The coating may include a dielectric grease or other substance that facilitates the sliding engagement and electrical conduction between the first and second electrical contacts 131, 132.

Figure 6A:
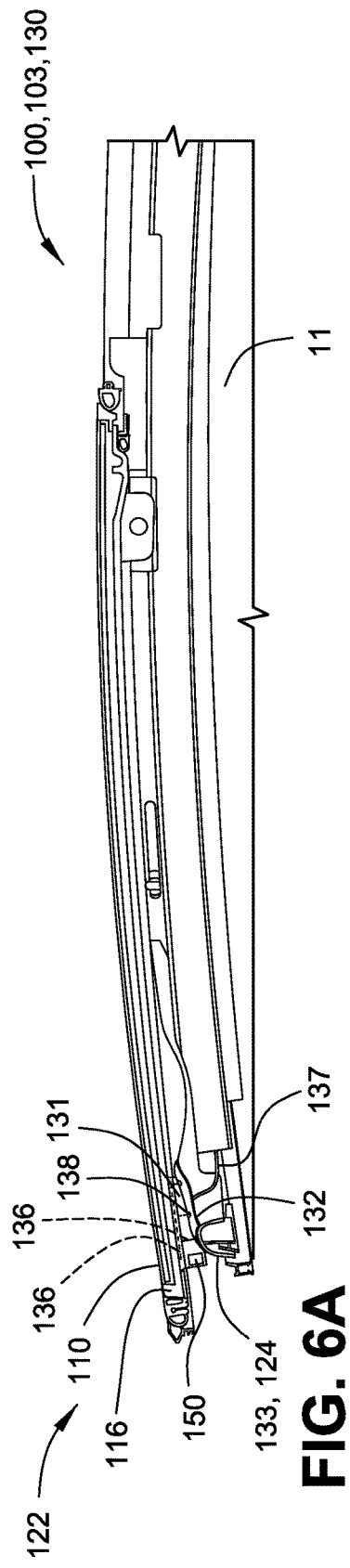
FIG. 6A: A cross-sectional representation of a movable window apparatus in a closed position.
Figure 6B:
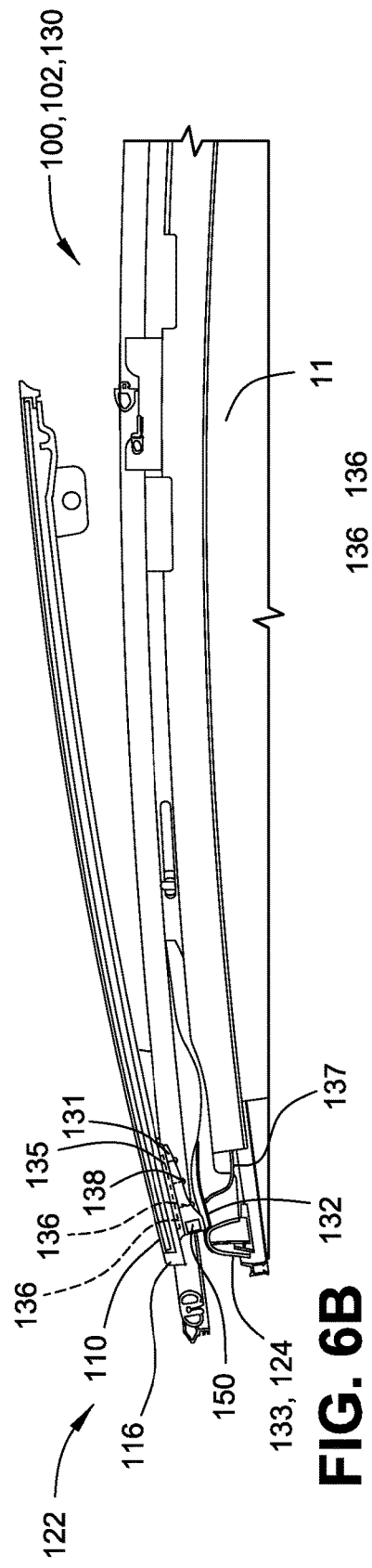
FIG. 6B: A cross-sectional representation of a movable window apparatus in a vented position.
Figure 6C:
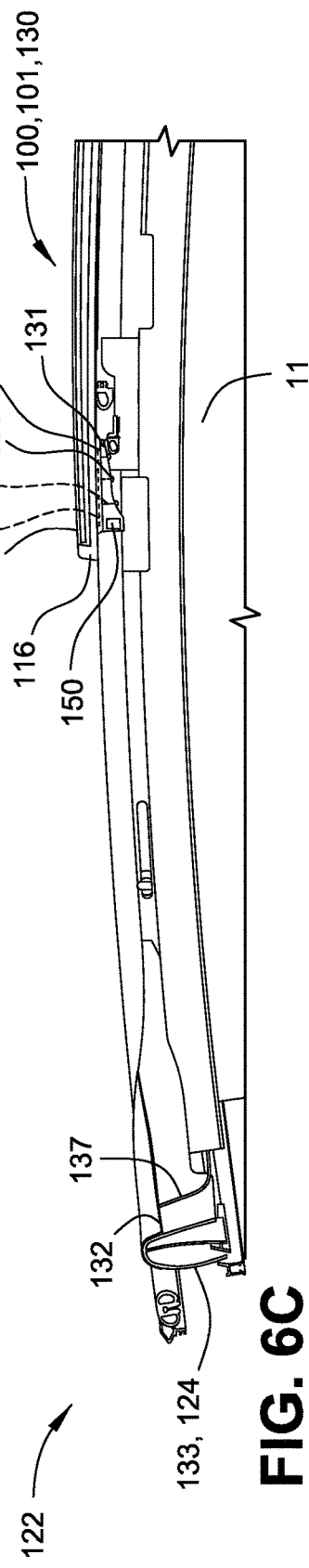
FIG. 6C: A cross-sectional representation of a movable window apparatus in an open position.

In some embodiments, window panel 110 may be operable to position into a venting position 102 (FIG. 6B). When in venting position 102, window panel 110 may be disposed over opening 11 such that window panel 110 is titled relative the one or more panels 12 of vehicle 101. Accordingly, a gap may be created between window panel 110 and opening 12, allowing for the ventilation of air into and/or out of interior 13. In some embodiments, window panel 110 may be tilted such that an end remains substantially in the same position in both closed position 103 and venting position 102 of window panel 110. In some embodiments, window panel 110 may be tilted such that the gap may be positioned at a rearward end of opening 11 opposite heading direction 30.

In such an embodiment, the conductive connection between first electrical contact 131 and second electrical contact 132 may be maintained while window panel 110 is in venting position 102. For example, first electrical contact 131 may be disposed at the end of window panel 110 not elevated. In other words, first electrical contact 132 may be disposed proximate the end of window panel 110 vertically closest the one or more panels 12, when window panel 110 is in venting position 102. Likewise, second electrical contact 132 may be disposed proximate an end of opening 11 vertically closest window panel 110. Accordingly, second electrical contact 132 may remain substantially in the same position in both closed position 103 and venting position 102 of window panel 110 to maintain engagement with first electrical contact 131.

In operation, window panel 110 may move between open and closed positions 101, 103. At a point in the range of positions of window panel 110, first electrical contact 131 may engage second electrical contact 132. The engagement may result in a conductive connection. Accordingly, an electrical connection may be formed with window panel 110. Therefore, in embodiments where window panel 110 is electro-optic, window control module 200 may be operable to vary the transmittance thereof.

In other embodiments, as illustrated in FIGS. 7A-8B, movable window apparatus 100 may comprise a second electrical connection assembly 140. Second electrical contact 140 may be one or more electrical contact. Further, second electrical connection assembly 140 may be operable to facilitate a conductive connection between vehicle 10 and/or window control module 200 with window panel 110. The conductive connection may operably conduct one or more of a current, a voltage, a potential, and/or an electrical signal. The conductive connection may be facilitated when window panel 110 is in a first position 104 (FIGS. 7A-B). First position 104 may correspond to an open position 101 or a closed position 103, depending on placement. Additionally, the conductive connection may be broken when window panel 110 is in a second position 105 (FIGS. 8A-B). Second position 105 may correspond to an open position 101 or a closed position 103, depending on placement.

Second electrical connection assembly 140 may comprise a contact pad holder 141. Contact pad holder 141 may be coupled to window panel 110. Further, contact pad holder 141 may comprise a first contact pad 142 and a second contact pad 143. First contact pad 142 may correspond to a positive electrical polarity terminal. Second contact pad 143 may correspond to a negative electrical polarity terminal. Further, first contact pad 142 and second contact pad 142 may be operable to receive and conduct one or more of a current, a voltage, a potential, and/or an electrical signal. Accordingly, the first and second contact pads 142, 143 may be electrical contact. Additionally, the first and second contact pads 142, 143 are communicatively connected to window panel 110. In some embodiments, the first and second contact pads 142 may protrude from the extent of window panel 110. Accordingly, contact pad holder 141 and/or the first and second contact pads 142, 143 may be disposed proximate a periphery of window panel 110. Further, each of the first and second contact pads 142, 143 may have a leading portion 144. In some embodiments, leading portion 144 may be rounded.

Second electrical connection assembly 140 may also comprise a first contact spring 145 and a second contact spring 146. Each of the first and second contact springs 145, 146 may be an electrically conductive material biased in a first configuration. First contact spring 145 may correspond to a positive electrical polarity terminal. Similarly, second contact spring 146 may correspond to a negative electrical polarity terminal. Accordingly, the first and second contact springs 145, 146 may be electrical contacts. Further, the first and second contact springs 145, 146 may be secured to a part of vehicle 10, such as a panel 12. In some embodiments, the first and second contact springs 145, 146 may be secured to vehicle 10 via a contact holder 147. Further, the first and second contact springs 145, 146 may be electrically connected to a power source, and/or window control module 200. Additionally, in some embodiments, the first and second contact springs 145, 146 may be disposed in a pocket comprised of one or more panel 12.

In operation, window panel 110 may be operable between first position 104 and second position 105 along a path. In operating into first position 104, the first and second contact pads 142, 143 may travel toward the first and second contact springs 145, 146. Upon window panel 110 reaching first position 104, leading portions 144 of the first and second contact pads 142, 143 may slidably engage the first and second contact springs 145, 146, respectively. Upon engagement, each contact spring 145, 146 may be operable to deflect from the biased configuration. Further, the bias toward the biased configuration may be operable to substantially force contact between a respective contact spring 145, 146 and a respective contact pad 142, 143. The force may operably stabilize the conductive connection. The engagement between a respective contact spring 145, 146 and a respective contact pad 142, 143 may accordingly result in the conductive connection. In operation out of first position 104 to second position 105, each of the first and second contact pads 142, 143 may slidably disengage the first and second contact springs 145, 146, respectively. The disengagement between a respective contact spring 145, 146 and a respective contact pad 142, 143 may accordingly result in breaking the conductive connection. In some embodiments, operation into first position 105 may correspond to an end of window panel 110 entering the pocket comprised of one or more panel 12.

Figure 6D:
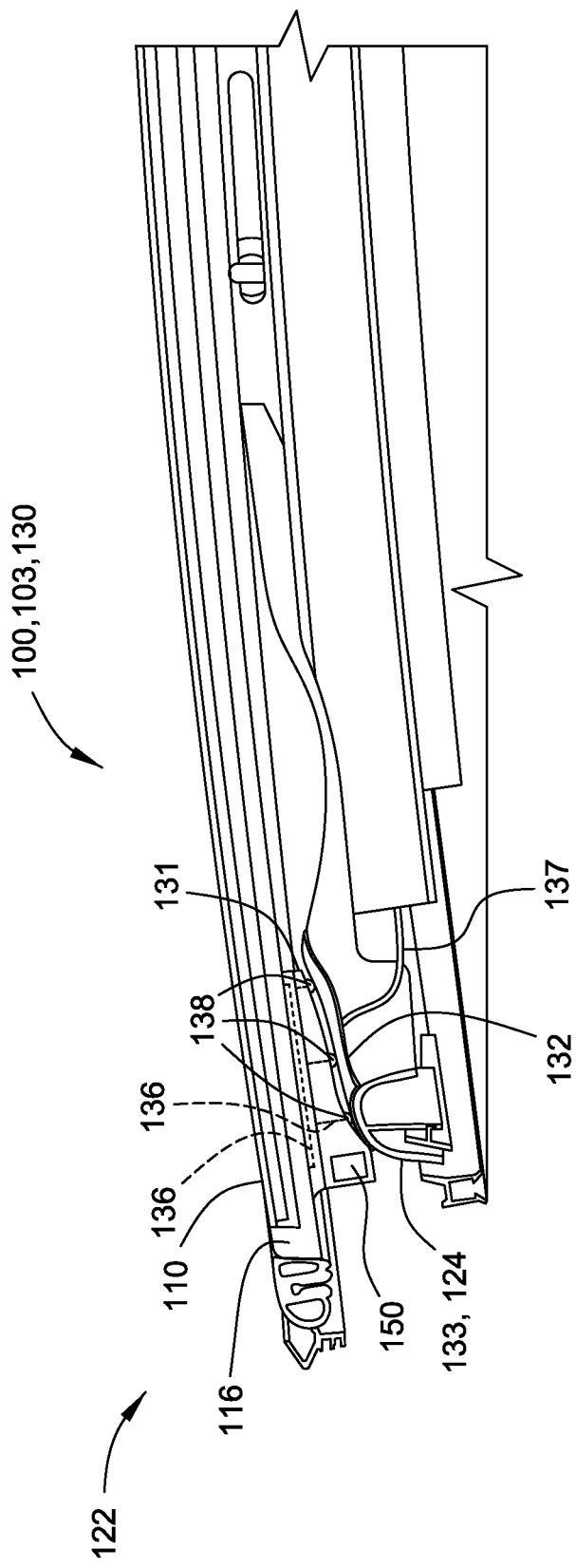
FIG. 6D: A close-up perspective representation of an electrical contact of an electrical connection assembly.

In some embodiments, movable window apparatus 100 may further comprise a power storage device 150 (FIG. 6D). Power storage device 150 may be electrically connected to first electrical contact 131, first contact pad 142, and/or second contact pad 143. Further, power storage device 150 may be coupled with window panel 110, frame 116, first electrical contact 131, first contact pad 142, and/or second contact pad 143, such that power storage device 150 moves with window panel 110 and/or frame 116. Further, an electrical connection between power storage device 150, first electrical contact 131, first contact pad 142, second contact pad 143, and/or window panel 110 may be maintained irrespective of the position of window panel 110 and/or the engagement of first electrical contact 131 with second electrical contact 132 or the engagement of the first and second contact pads 142, 143 with the first and second contact springs 145, 146. Power storage device 150, for example, may be one or more of a capacitor and a battery. In some embodiments, power storage device 150 may be disposed in housing 135.

In some embodiments, the first and second contact pads 142, 143 and/or the first and second contact springs 145, 146 may have a coating. The coating may include a dielectric grease or other substance that facilitates the sliding engagement and electrical conduction between the first and second contact pads 142, 143 and the first and second contact springs 145, 146, respectively.

In operation, power storage device 150 may be operable to supply the one or more of a current, a voltage, a potential, a power, and/or an electrical signal to window panel 110 in the absence of the conductive connection between first electrical contact 131 and second electrical contact 132 or the first and second contact pads 142, 143 with the first and second contact springs 145, 146. Further, power storage device 150 may be further operable to recharge when the conductive connection is made between first electrical contact 131 and second electrical contact 132.

In some embodiments, window panel 110 and/or frame 116 may further comprise one or more powered feature. A powered feature may be a device coupled with window panel 110, frame 116, first electrical contact 131, first contact pad 142, and/or second contact pad 143. such that power storage device 150 moves with window panel. Further, the powered feature may require a current, a voltage, a potential, and/or an electrical signal to operate. Accordingly, the powered feature may be electrically connected to first electrical contact 131, first contact pad 142, second contact pad 143, and/or power storage device 150, in order to obtain the required power. Examples of a powered feature include a light, a sensor 300, and/or a display.

In some embodiments, movable window apparatus 100 may further comprise a wireless communication module 160 (FIG. 3). Wireless communication module 160 may be wirelessly communicatively connected to window control module 200 and physically communicatively connected to window panel 110. The wireless communication, for example, may comprise Bluetooth, WiFi, cellular, radio, infra-red, or other wireless communications technologies known in the art. Further, wireless communication module 160 may be coupled with window panel 110 and/or frame 116, such that wireless communication module 160 moves with window panel 110 and/or frame 116. Accordingly, wireless communication module may be operable to maintain communication between window control module 200 and window panel 110, even in the absence of the conductive connection between first electrical contact 131 and second electrical contact 132 or the first and second contact pads 142, 143 with the first and second contact springs 145, 146. Therefore, the transmittance of window panel 110 may be adjusted by window control module at any position of window panel 110.

Various embodiments of the present disclosure may have the advantage of enabling a conductive connection with a window panel 110 that is movable. This conductive connection has the advantage of being engageable and dis-engageable. Accordingly, in embodiments where window panel 110 is electro-optic, the need for a conductive connection does not inhibit movement between one or more positions. Additionally, in embodiments where first electrical contact 131 comprises a protrusion 138 extending toward second electrical contact 132, the engagement between first electrical contact 131 and second electrical contact 132 may be focused at protrusion 138. Focusing the engagement at protrusion 138 may have the advantage of optimizing the conductive connection between first electrical contact 131 and second electrical contact 132. Further, in embodiments where first electrical contact 131, second electrical contact 132, first contact pad 142, second contact pads 143, first contact spring 145, and/or second contact spring 146 comprises a coating, such as a dielectric grease, may have the advantage of increased longevity of the slidably engaging elements. Additional benefits or advantages of various embodiments may also be realized and/or achieved.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. An apparatus for a vehicle, comprising:
   a window panel movable between an opened position and a closed position relative to an opening of the vehicle;
   a deflector movable between extended and retracted positions, wherein the deflector:
     is mechanically biased to the extended position,
     moves to the extended position when the window panel is in the open position, and
     deflects wind from the opening when in the extended position;
   a first electrical contact coupled to the window panel; and
   a second electrical contact disposed along a portion of the deflector, wherein the portion is of a top most surface of the deflector when the deflector is in the extended position;
   wherein:
     the first electrical contact:
       engages the second electrical contact when the window panel is in the closed position, and
       disengage the second electrical contact when the window panel is in the open position; and
     engagement of the second electrical contact by the first electrical contact forms a conductive connection.

2. The apparatus for the vehicle of claim 1, wherein engagement of the second electrical contact by the first electrical contact moves the deflector to the retracted position.

3. The apparatus for the vehicle of claim 1, wherein the window panel comprises an electro-optic element and the first electrical contact is electrically connected to the electro-optic element.

4. The apparatus for the vehicle of claim 3, wherein the conductive connection is operable to conduct an electrical signal operable to vary the transmittance of the electro-optic element.

5. The apparatus for the vehicle of claim 1, wherein the first electrical contact comprises at least one protrusion, wherein the engagement of the second electrical contact is by the at least one protrusion of the first electrical contact.

6. The apparatus for the vehicle of claim 1, further comprising:
   a power storage device coupled to:
     the window panel such that movement between the open and closed positions of the window panel translates to movement of the power storage device, and
     the first electrical contact such that the power storage device receives power from the first electrical contact;
   wherein the power storage device supplies the window panel with power when the first electrical contact is not in engagement with the second electrical contact.

7. The apparatus for the vehicle of claim 6, further comprising a wireless communication module communicatively connected to the window panel and a controller disposed in the vehicle, such that the controller may very a transmittance of the window panel when the first electrical contact is not in engagement with the second electrical contact.

8. The apparatus for the vehicle of claim 1, wherein the window panel is a sunroof.

9. The apparatus for the vehicle of claim 1, further comprising a light sensor disposed in an interior of the vehicle relative the window panel, wherein the window panel is operable to vary its transmittance based, at least in part, on a level of light detected by the light sensor.

* * * * *